United States Patent Office 3,376,251
Patented Apr. 2, 1968

3,376,251
METAL CONTAINING OLEFIN POLYMERS HAVING IMPROVED COLOR
John H. Hennes, Newport News, Va., assignor to The Dow Chemical Company, Midland, Mich., a corporation of Delaware
No Drawing. Filed Mar. 1, 1965, Ser. No. 436,321
3 Claims. (Cl. 260—41)

ABSTRACT OF THE DISCLOSURE

The tendency of metal ion containing compounds to discolor olefin polymers is substantially reduced and the achromic characteristic of the polymer maintained by adsorbing the metal containing compound on a finely divided, inorganic mineral adsorbent substrate, prior to its incorporation in the olefin polymer.

---

This invention relates to olefin polymer compositions containing minor amounts of color producing metal ions and more particularly to olefin polymer compositions containing such metal ions having improved color.

The incorporation of inorganic and organic metal ion containing compounds into olefin polymers for a variety of purposes such as stabilizers and dye assisting adjuvants is well known to the art. Unfortunately the incorporation of these metal ion containing compounds and especially compounds containing nickel, vanadium, cobalt, and ferric ions in the olefin polymer often cause an objectionable color to be imparted to the olefin polymer. For example, the incorporation of nickel containing compounds in polypropylene generally imparts a greenish color to the polymer.

The achromic character of a polymer is of considerable commercial importance in determining the usefulness and acceptability of olefin polymers as film and fiber forming materials.

According to the present invention, the tendency of metal ion containing compounds to discolor olefin polymers is substantially reduced and the achromic characteristic of the polymer maintained by adsorbing the metal containing compound on a finely divided, inorganic mineral adsorbent substrate, prior to its incorporation in the olefin polymer.

In general, the metal containing compound is adsorbed on the substrate by dispersing the inorganic mineral adsorbent particles in a dilute aqueous solution (i.e. about 1 percent to 20 percent) of the metal containing compound, and desirably the inorganic mineral adsorbent is contacted with the aqueous solution for a time sufficient to permit an adsorption equilibrium to be reached. After sufficient contact time for adsorption, the inorganic mineral adsorbent particles are removed and dried and in this form are suitable for incorporation in the olefin polymer.

Illustrative examples of inorganic mineral adsorbents which may be employed in the present invention include montmorillonite clays, diatomaceous earth, fuller's earth, kaolin, talc, zeolites and molecular sieves.

Advantageously the metal containing compound may be adsorbed on the surface of an inorganic mineral adsorbent incorporated in the olefin polymer for some other specific purpose such as $TiO_2$, which is ordinarily used as a delusterant, or expanding lattice clays such as bentonite which according to co-pending application Ser. No. 277,080 of Charles R. Pfeifer, filed May 1, 1963, renders olefin polymers dyeable with basic dyestuffs to bright shades of coloration with exceptional lightfastness properties.

The inorganic mineral adsorbent particles suitable for incorporation in olefin polymers are generally in unagglomerated form and are relatively minute in particle size. Preferably, the size of the inorganic mineral adsorbent particles that are employed are smaller than about 50 microns and generally in the range of 1–15 microns. Particles of increasing size tend to make for non-uniformity in appearance as well as to degrade the physical properties of a product fabricated from the composition.

In referring to olefin polymers, the present invention is especially concerned with polymers prepared from hydrocarbon aliphatic olefins including both mono- and di-olefins (including polymerizable mixtures thereof) and particularly alpha-olefins that contain from 2 to 8 carbon atoms, such as ethylene, propylene, butylene, 3-methyl-1-butene, 4-methyl-1-pentene. Other useful poly-olefins include polymers prepared from vinyl aromatic monomers having the structural formula:

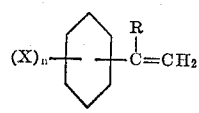

wherein R is selected from the group consisting of hydrogen, and methyl; X is individually selected from hydrogen, chlorine, bromine and alkyl radicals containing from 1 to 4 carbon atoms; and $n$ is an integer from 1 to 4. Illustrative examples of such vinyl aromatic monomers include styrene, ortho-, meta-, and para-methyl- and ethyl-styrene; para-isopropyl styrene; ortho, para-dimethyl styrene, ortho-, meta-, and para-chloro- and bromo-styrene, di-chloro styrene and alpha-methyl styrene.

Beneficially, between about 0.25 and about 25 weight percent, based on composition weight, of the inorganic mineral adsorbent having adsorbed thereon the metal ion containing compound is incorporated with the olefin polymer. Ordinarily, between about 1 and about 15 weight percent, and advantageously between about 2 and 5 weight percent, based on composition weight, is incorporated in the polyolefin to provide the desirable attributes of the composition. The exact amount that is employed may vary somewhat depending on the particular type of adsorbent, the olefin polymer and the use for which the olefin polymer product is to be employed.

In the preparation of the compositions of the present invention it is preferable to dry blend the olefin polymer in powder, finely divided, or pulverulent form with the dried inorganic adsorbent having adsorbed thereon the metal ion containing compound which is also in a powdered or otherwise finely ground condition. This means of mixing is convenient whether the blended composition is to be fabricated into a shaped article by melt extrusion or whether it is to be first dissolved in a suitable solvent and then fabricated into a solid shaped article by evaporation or otherwise removal of the solvent. Other means can be used to incorporate the adsorbent material in the polyolefin composition. Among these methods are the addition of the solid to the polyolefin while the latter is in molten condition or dissolved in a solvent, either of which, if convenient and desirable, can be done during the latter steps in the manufacture of the polyolefin. More frequently, the addition will be handled just prior to the fabrication treatment when the polyolefin is in the form of chips. Using any blending method, it is important that a relatively uniform mixture be attained.

Additives such as ultraviolet light adsorbers, anti-acids such as aluminum or calcium soaps, anti-oxidants, fillers and the like, may also be incorporated into olefin polymer.

The process of the present invention is illustrated more particularly by way of the following examples, but as will be more apparent, is not limited to the details thereof.

EXAMPLE 1

Bentonite dust (Volclay) of 1–10 micron particle size was dispersed in a 10 percent aqueous solution, at room temperature, of the nickel phenolate of bis(p-tertiary octylphenol) monosulfide, and stirred for one hour at room temperature. The treated bentonite was dried and a portion of the so treated bentonite was mixed with chips of isotactic polypropylene and blended by melting in a screw extruder to obtain a polypropylene composition containing 2.87 percent by weight bentonite and 0.04 percent by weight nickel. The blended, screened extrudate was cut into chips and fed into a hopper at one end of a screw extruder and forced through a series of heat zones ranging from 230–300° C. wherein the polymer was compressed, melted, filtered, and forced through a spinnerette having a plurality of orifices. The extruded filaments were air cooled, collected, and then heat-drawn three to eight times their original length. The so fabricated fibers were then examined for color and found to be essentially white in color.

By way of contrast, a polypropylene fiber prepared by the above procedure containing an equivalent amount of the nickel phenolate of bis(p-tertiary octylphenol) monosulfide and bentonite, with the exception that the nickel compound had not been first adsorbed on bentonite prior to its introduction into the polypropylene had an observable greenish tint.

EXAMPLE 2

Following the procedure of Example 1 [2,2'-thiobis(4-t-octylphenolato)]-n-butyl amine Nickel II was adsorbed on bentonite and the so treated bentonite incorporated into an isotactic polypropylene resin and the resin spun into fibers. The resultant fibers had a bentonite content of 2.3 percent by weight and a nickel content of about 0.03 percent by weight.

A portion of the so fabricated fibers were cut into small pieces and chopped into a slurry in a Waring Blendor. The slurry was then filtered through a Büchner-type funnel to form a pad which was then dried. The "$a$" color value of the fiber was determined with a Hunter Color and Color Difference Meter. The more negative the "$a$" value of a sample rated with this meter, the greener the color of the sample.

The fiber prepared above was essentially white and had an "$a$" value of −2.8.

By way of contrast polypropylene fibers prepared in accordance with the above procedure containing an equivalent amount (0.03 percent by weight) of [2,2'-thiobis(4-t-octylphenolato)]-n-butylamine Nickel II but which did not contain bentonite had an observable greenish color tinge and had an "$a$" color rating of −4.3.

In a similar manner other compounds containing colored metal ions such as vanadium and iron can be adsorbed on a suitable inorganic mineral adsorbent as mentioned above and in this condition can be incorporated in any of the olefin polymers described above without substantially discoloring the polymer.

What is claimed is:

1. An achromic composition consisting essentially of about 75 to about 99.75 percent by weight of
    (a) polypropylene and
    (b) from about 0.25 to 25 percent by weight of bentonite having adsorbed thereon a metal ion containing compound which by itself has a propensity to discolor the polypropylene selected from the group consisting of nickel phenolate of bis(p-tertiary octylphenol)monosulfide and (2,2'-thiobis(4-t-octyl phenolate))-n-butyl amine Nickel II.

2. The composition of claim 1 wherein the metal ion containing compound is the nickel phenolate of bis(p-tertiary octylphenol)monosulfide.

3. The composition of claim 1 wherein the metal ion containing compound is [2,2'-thiobis(4-t-octyl phenolate)[-n-butyl amine Nickel II.

References Cited

UNITED STATES PATENTS

| 2,984,634 | 5/1961 | Caldwell | 260—45.75 |
| 3,240,552 | 3/1966 | Joyner | 260—45.75 |
| 2,883,356 | 4/1959 | Gluesenkamp | 260—37 |
| 2,876,133 | 3/1959 | Iler | 260—37 |
| 2,971,940 | 2/1961 | Fuchman | 260—47.5 |

FOREIGN PATENTS

| 889,680 | 2/1962 | Great Britain. |

JULIUS FROME, *Primary Examiner.*